June 3, 1958 J. C. HANSEN 2,837,310
DEVICE FOR INSPECTING SIDE WALLS OF TIRES
Filed March 23, 1955
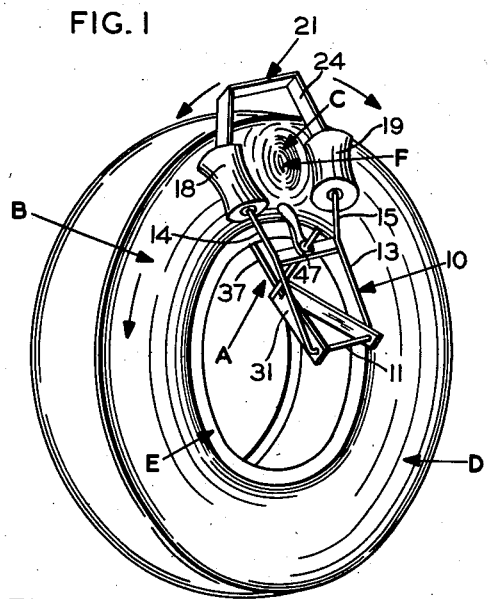
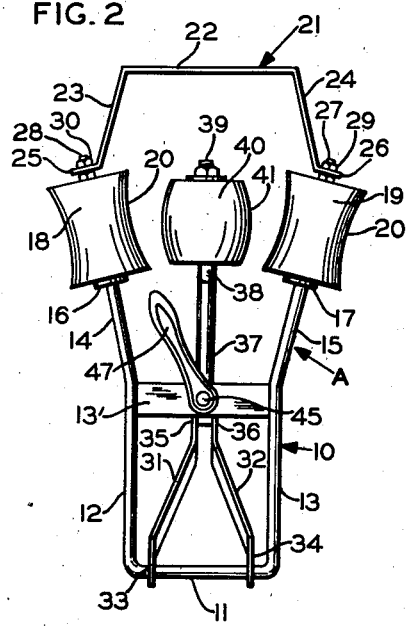
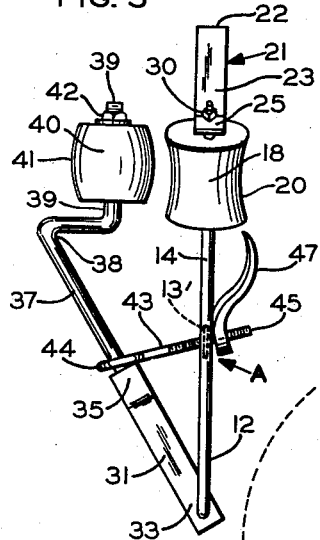
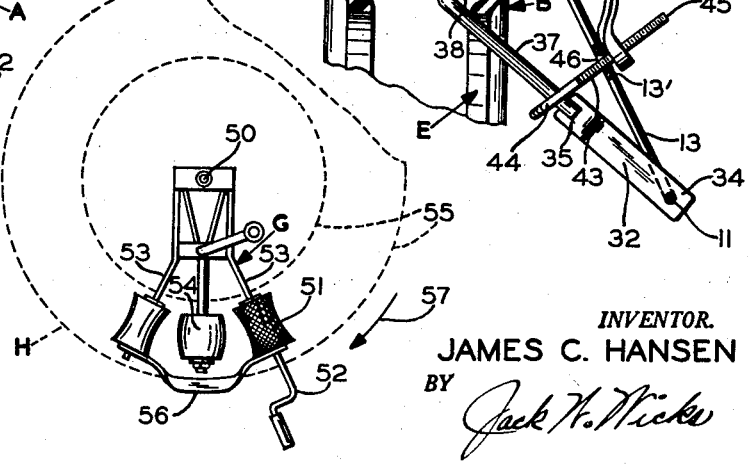
INVENTOR.
JAMES C. HANSEN
BY
ATTORNEY United States Patent Office 2,837,310
Patented June 3, 1958.

2,837,310

DEVICE FOR INSPECTING SIDE WALLS OF TIRES

James C. Hansen, Minneapolis, Minn.

Application March 23, 1955, Serial No. 496,194

7 Claims. (Cl. 254—50.2)

My invention relates to an improvement in a tire inspection device and more particularly to a device for inspecting the side walls of a pneumatic tire by deflecting or bulging a side wall outwardly under stress to thereby open and expose any cracks or bruises.

It is an object of my invention to provide a device which may be positioned on the wall of a tire when the tube has been removed and easily moved to any spot on the wall without the same dropping from the tire. The means for bulging the tire maintains the device on the tire.

It is a further object to provide a tire wall inspection device which mounts on the wall of the tire and which forces a portion of the tire wall outwardly between two spaced members.

It is also a feature to provide a tire wall inspection device having two spaced concave rollers for contact with the outer surface of the tire wall and a convex roller mounted inwardly and centrally of the two rollers with adjustable means for progressively moving the convex roller toward the two rollers thereby forcing a bulge in the sidewall between the two concave rollers. With the device so positioned, the surface of the bulge may be inspected, and it is a further feature to provide a device of a construction whereby the same may be moved around the wall of the tire and at the same time always maintaining an outwardly extending bulge in the wall of the tire.

It is a further feature to rotatably mount the spaced concave rollers on shafts which are in line with the radii of the tire so that the same may be pivoted at the center of the tire as the device is moved around the tire wall, the rollers tending to always move in a circular path. It is an additional feature to rotatably mount the convex roller so that the whole unit moves easily along the wall of the tire.

It is a further feature to provide means for adjusting the amount of bulge or degree that the inner convex roller forces the tire wall outwardly between the spaced concave rollers. The greater the degree of deformation of the tire, the more difficult the moving of the device along the walls and the more secure the device is maintained on the tire.

It is also a feature of my invention to provide a tire inspection device which may be pivotally mounted on the circular bed of a tire changing mechanism and in addition thereto to provide means for rotating one of the concave rollers whereby the tire is drawn to and made to proceed between the rollers for inspection.

The invention will appear more clearly from the following detailed description when taken in connection with the accompanying drawings, showing by way of example a preferred embodiment of the inventive idea wherein like numerals are employed to designate like parts throughout.

In the drawings forming part of this application:

Figure 1 is a perspective view of my tirewall inspection device in position on a tire, with a slight bulge in the tire illustrated.

Figure 2 is a front elevational view.

Figure 3 is a side view of my device.

Figure 4 is a side view of the device in operative position on a tire shown in section with a slight bulge shown. A part of the device is also shown in section.

Figure 5 is a top plan view of an alternative form of my device pivotally mounted on the bed of a tire changing device illustrated simply in broken lines with hand operable power means secured to one of the concave rollers.

Referring to the drawings in detail, my tire wall inspection device A is composed of the substantially U-shaped frame 10 which includes the base portion 11. The side portions 12 and 13 extend at right angles from the base portion 11. Formed on the upper ends of the side portions 12 and 13 are the angularly extending bearing arms 14 and 15 respectively. The angle of the bearing arms 14 and 15 with respect to the frame 10 is substantially on the radii of the tire when the device is placed in the operative position shown in Figure 1, the benefit of which will be hereinafter set forth.

Secured to the bearing arms 14 and 15 are the shoulder members 16 and 17 respectively. I further provide the roller members 18 and 19 which are rotatably positioned on the bearing arms 14 and 15 respectively. The surface of the spaced apart roller members 18 and 19 are constructed with a concave formation as at 20.

I further provide the handle member 21 which is formed of the upper hand engageable portion 22 together with the depending side portions 23 and 24 and the end lip portions 25 and 26 formed on the side arm portions 23 and 24 respectively. The end lip portions 25 and 26 have holes formed therethrough through which the upper ends 27 and 28 of the arms 14 and 15 are positioned. The handle 21 is secured to the upper end portions 27 and 28 by means of the nuts 29 and 30 respectively. The side portions 12 and 13 may be rigidly connected together and supported by the cross bar 13'.

I further provide the arm members 31 and 32 which are pivotally connected at their lower ends 33 and 34 respectively to the base portion 11 of the frame 10. Connected to the outer free ends 35 and 36 of the arms 31 and 32 respectively is the rod member 37 which has formed therein the offset portion 38. Extending from the offset portion 38 is the bearing portion 39 on which is maintained the cylindrical roller 40 having the convex surface as at 41. The convex roller 40 is rotatably maintained on the bearing portion 39 and secured thereon by means of the nut 42.

It is apparent that my device works most efficiently with the concave surfaces formed on the roller members 18 and 20 in combination with the convex surface formed on the roller 40; however, it is apparent that the rollers mentioned may be in simple cylindrical formation and within the spirit and scope of the invention the same need not be rotatably maintained.

I further provide the draw-up member 43 which has formed in the lower end thereof an eye formation as at 44 through which the rod member 37 freely extends. The upper end 45 of the draw-up member 43 is threaded and extends freely through the opening 46 formed in the cross bar 13'. Threadedly maintained on the threaded end 45 of the draw-up member 43 is the single wing nut member 47.

In using my device, the same is opened to the position shown in Figure 3 by unscrewing the wing nut member 47 so that the side wall of the tire may be positioned between the convex roller 40 and the pair of concave rollers 18 and 19. The inspection device may then be held in position on the wall of the tire and the wing nut member 47 screwed down upon the threaded end 45 thereby drawing the roller 40 toward and centrally of the rollers 18 and 19 and at the same time forcing a small portion of the tire wall B into a bulge formation extending outwardly between the rollers 18 and 19 as at C. A bulged condition of the side wall C is shown more or less in detail in Figure 4 as well as in Figure 1. With the side wall B deformed or bulged as at C, any cracks or bruises existing in the side wall B are opened up so that the operator may determine the extent of the same so that a decision may be made as to whether or not the tire may be used again from a safety standpoint.

The entire side wall B may be inspected, if the defects are not apparent on the surface, by the operator placing one hand on the portion 22 of the handle 21 and drawing, for example, in the direction of the arrow in Figure 1, at the same time with the other hand holding the portion 11 substantially at the axis of the tire D. In moving the device in this manner, the angular disposition of the members 14 and 15 on the radii of the tire D allows the device to follow the wall B in a circular path thereby allowing easy covering of the circular side wall B.

It will be noted that as the roller 40 is drawn between the rollers 18 and 19 to the position shown in Figure 4 to thereby produce the bulge as at C, the bead E of the tire D fits neatly into the offset portion 38 to allow free movement of the roller 40 towards and between the rollers 18 and 19. With my device in the position shown in Figures 1 and 4, a crack such as F is spread open to a great degree from its state when the side wall B is in a normal position.

Thus, with my device the side wall of a pneumatic tire may be quickly and easily deflected or bulged at any point thereon where a crack or bruise appears, or the entire surface may be covered to search out any possible small cracks or slight bruises and then determine the extent of the damage or injury to the side wall such as B. The inspection device A is easily removed from the tire by merely unscrewing the single wing nut 47 to a point where the roller 40 may be easily removed from the position inside the tire wall.

I also provide an alternative form of my tire inspection device as illustrated in Figure 5 where the device G is pivotally mounted on the shaft 50 which is part of the tire changing bed indicated as H. The alternative form G works on exactly the same principle as disclosed on Figures 1 through 4, but in addition the concave roller 51, substantially the same as the roller 18, has connected thereto the handle 52 which when operated rotates the roller 51. The roller 51 is rotatably mounted on the bearing arm 53, substantially the same as the bearing arm 41. The surface of the roller 51 may be knurled so that it tends to draw the tire towards the roller 51 in the direction of the convex roller 54 as the tire lies on the circular bed indicated by the broken circular lines 55. The shaft 50 allows my device G to be positioned at any position on the bed H and the same may be steadied by grasping the flat handle portion 56 and at the same time turning the handle 52 so that the tire proceeds on the bed H in the direction of the arrow indicated as 57.

It is apparent that the driving concave roller 51 may also be driven by any suitable power means such as a nut tightening device, etc., and I do not wish to be limited to the type of driving power for the roller 51. It is also apparent that my device may be used to inspect material presented in any type of linear formation.

The invention is not to be understood as restricted to the details set forth since these may be modified within the scope of the appended claims without departing from the spirit and scope of the invention.

Having thus described the invention, what I claim as new and desire to secure by Letters Patent is:

1. In a device for inspecting the side walls of a pneumatic tire, a frame member having a base formed with two spaced extremities, a pair of rollers each rotatably mounted on an extremity of said frame, an arm member pivotally mounted on said base of said frame member and lying centrally of said extremities, a deformer roller rotatably mounted on said arm member, and means for drawing said arm member and deformer roller toward and centrally of said pair of rollers 2. In a device for inspecting the side walls of a pneumatic tire, a frame member formed with a base portion and outwardly extending spaced bearing arms extending therefrom, cylindrical members rotatably mounted on said bearing arms, an arm pivotally mounted on said base portion of said frame member and positioned to move centrally of said bearing arms, a single cylindrical member rotatably mounted on the outer end of said pivoted arm, handle means connecting said bearing arms, screw means connected to said frame and said pivoted arm for drawing said pivoted arm and said single cylindrical member between said cylindrical members of said bearing arms.

3. In a device for inspecting side walls of a pneumatic tire, a frame, a pair of cylindrical members rotatably mounted in spaced relationship on said frame, an arm member pivotally mounted on said frame centrally of said pair of cylindrical members, a cylindrical member rotatably mounted on the outer end of said arm, said arm having an offset portion formed thereon to accommodate the bead of the tire, and means for drawing said cylindrical member on said arm toward and centrally of said pair of cylindrical members.

4. A device for inspecting the sidewalls of tires comprising a frame, a pair of spaced concave cylindrical rollers rotatably mounted on said frame, arm means pivotally mounted on said frame, a convex cylindrical roller rotatably mounted on said arm means, and means for drawing said convex roller between said pair of rollers to bulge and stretch the tire wall of a tire over said convex roller which has been placed over said convex roller and under said pair of concave rollers.

5. A device for inspecting the side walls of a pneumatic tire comprising a U-shaped frame member, a pair of rollers each rotatably mounted on the outer free ends of said frame, arm means pivotally mounted on said frame member, a deformed roller rotatably mounted on the outer end of said arm means, means for drawing said arm means and said deformer roller toward and centrally of said pair of rollers, and means for rotating one of said pair of rollers to move the wall of the tire to and away from said rotated roller and over said deformer roller.

6. In a device for inspecting side walls of a pneumatic tire, a frame including a transverse base portion, a bearing arm extending from each end of said base portion, a roller rotatably mounted on each of said bearing arms, an arm member pivotally mounted on said base portion and having a deformer roller rotatably mounted thereon, a handle member connected to the outer ends of said bearing arms, and screw means for drawing said pivoted arm member and deformer roller toward and centrally of said pair of rollers.

7. The structure of claim 6 in which a portion of each of the outer free ends of said bearing arms is flared outwardly.

References Cited in the file of this patent

UNITED STATES PATENTS

| | | |
|---|---|---|
| 1,193,691 | Hoyt | Aug. 8, 1916 |
| 1,697,708 | Blackmon | Jan. 1, 1929 |
| 1,954,300 | Sorum | Apr. 10, 1934 |
| 2,266,327 | McGowan | Dec. 16, 1941 |